Figure 1:
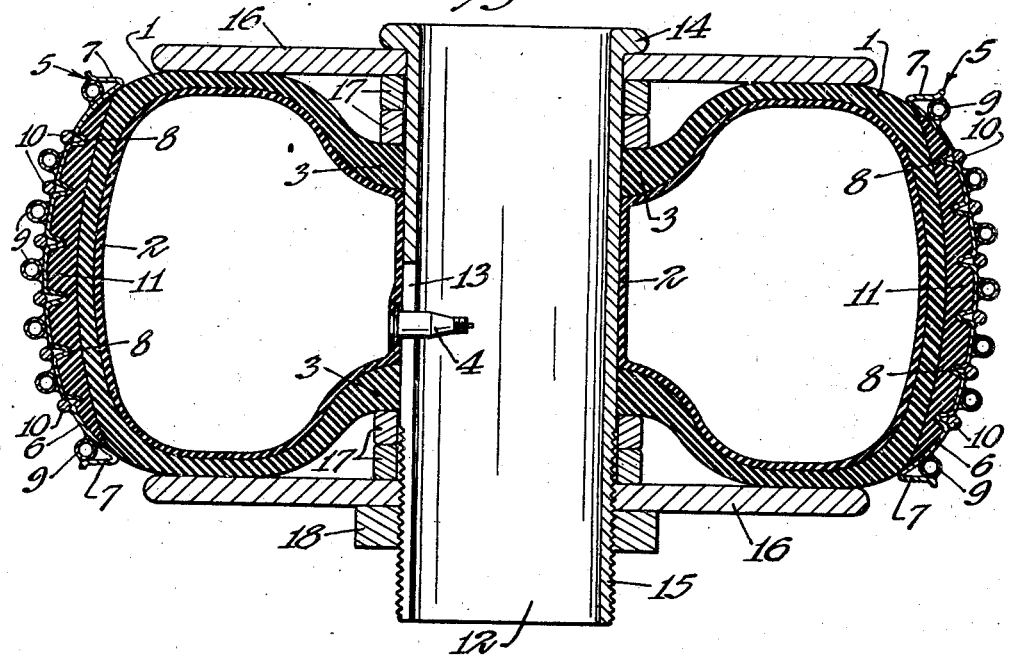

April 8, 1947.  P. E. HAWKINSON  2,418,584
TIRE RETREADING EQUIPMENT
Original Filed Nov. 29, 1944

Inventor
Paul E. Hawkinson
By Merchant & Merchant
Attorneys

Patented Apr. 8, 1947

2,418,584

UNITED STATES PATENT OFFICE

2,418,584

TIRE RETREADING EQUIPMENT

Paul E. Hawkinson, Minneapolis, Minn., assignor to Paul E. Hawkinson Company, Minneapolis, Minn., a corporation of Minnesota Continuation of application Serial No. 565,627, November 29, 1944. This application June 7, 1946, Serial No. 675,064

1 Claim. (Cl. 18—18)

My invention relates to a novel structure to be used particularly in the retreading or vulcanizing of tires and wherein it is found desirable or necessary to bring pressure on the sides of the tire in the form of, what is known in the trade as, "side plates." Side plates may be used either for the purpose of relieving the side walls of pneumatic tires from excess pressure or to force the peripheral tread portion of the tire against the mold or matrix with greater pressure. It is understood that my invention may be utilized for either of the two objects sought to be attained.

It is the primary object of my invention to provide a highly efficient and novel rim and side plate combination which may be constructed in a minimum of time and with a minimum of materials.

Another object of my invention is the construction of a device of the kind described which can be used at a great saving of time to the operator in the retreading or repairing of pneumatic tires.

The above and other objects will be apparent from the attached drawings and the following specification.

Figure 2:
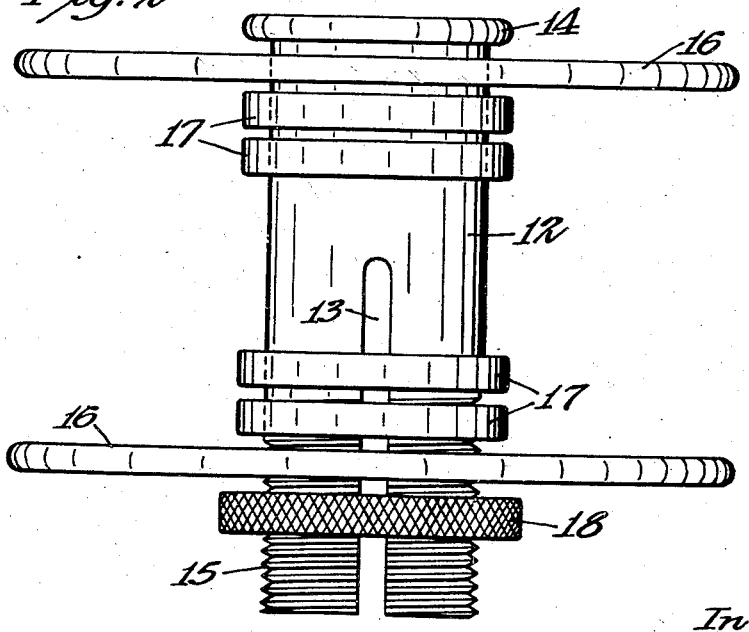

Referring to the drawings wherein like characters indicate like parts throughout the several views:

Fig. 1 is a vertical axial section of my novel rim and side plate structure, shown as being mounted on a tire being retreaded; and Fig. 2 is a side elevation of my novel structure.

Referring more particularly to the drawings, the numeral 1 indicates a tire having an inner tube 2 and reinforced bead sections 3. The inner tube 2 is shown as being provided with a valve stem 4.

Mounted on the peripheral outside surface of tire 1 is a one-piece tire retreading matrix 5, generally of the type disclosed in my earlier issued Patent 1,917,262 and consisting of a one-piece sheet metal matrix 6 bent so as to provide laterally spaced confining flanges 7 and tread design forming ribs 8. On its outer side, sheet metal member 6 is shown as having a copper steam conducting tube 9 soldered or otherwise secured thereto, and wound in a spiral manner. Said sheet metal member 6 is also shown as being provided with a plurality of metal reinforcing rings 10, preferably in the form of wire.

The new rubber being vulcanized to the crown of the tire 1 is indicated by the numeral 11.

An elongated tubular rim member 12 is shown as being provided with an axial slot 13 extending from one end thereof to a point beyond the center. The opposite end of said tubular member 12 is provided with an outwardly turned retaining flange 14. The slotted end of tubular rim member 12 is provided at 15 with threads which may extend inwardly any desired distance, but preferably, and as shown, extending inwardly about one-third of the length thereof.

A pair of annular plate members 16 are adapted to fit loosely over the threads 15 and one thereof is adapted to abut against flange 14 on the opposite end of said tubular rim member 12. The other member 16, as shown, is retained in spaced relation so that each thereof comes in contact with the opposite sides of the tire casing placed therebetween, as shown in Fig. 1.

Centering rings 17 are inserted between each annular plate member 16 and the bead portions 3 of the tire. A knurled burr member 18 is shown as having screw threaded engagement with the threads 15 of member 12.

Operation

As indicated above, mold 5 is unbroken, and as shown, it is of less diameter than the normal diameter of the tire. To enter the tire into such a mold it is recommended that the operator spread the bed portions 3 apart at circumferentially spaced points so as to contract the tire to a diameter less than that of the mold member 5, all as more specifically disclosed and claimed in my earlier patent Re. 21,956.

One of the annular side plates 16 is then dropped over the tubular rim member 12 until it comes into contact with the flange 14, as shown in Fig. 1. The desired number of spacer or centering rings 17 are then inserted over the tubular member 12, also as shown in Fig. 1, wherein two of said members 17 are utilized.

The inner tube 2 is then placed within the tire casing 1 and the casing is then dropped over the said tubular member so that the valve stem 4 of tube 2 is in alignment with the slot 13. Bead members 3, as shown in Fig. 1, will come into contact with the spacer or centering rings 17. An equal number of spacer rings 17 are then inserted loosely over the threaded members until they come to rest against the opposite bead; the other annular side plate 16 is then dropped loosely over the threaded tubular member 12; and the knurled burr 18 is screwed inwardly until sufficient pressure is brought to bear upon each side of the tire casing by the opposed annular plates 16.

Air is then inserted into the tire so as to expand the same with greater force against the matrix 5 and heat is introduced into the spiral steam coil or tube 9 so that the rubber 11 is cured.

While I have shown my novel equipment as being used in conjunction with the well known Hawkinson apparatus and method of retreading, it, of course, does not follow that this particular combination of side plates and rim structure is confined in its use to such equipment and methods. In fact, it may well be used with any type of full-circle retreading equipment with substantially equal benefit.

Furthermore, it should be obvious that my equipment is adaptable for use in any vulcanizing mold of full-circle construction wherein it is desired to bring pressure against the side walls of the tire.

The tire illustrated is one of small cross-sectional and overall diameter, such as used on the tail wheels of cub and trainer airplanes. The apparatus illustrated is only of such construction as to be adequately strong to withstand the pressures exerted by such a tire. However, this combination of rim and side plate structure may be used with equal benefit on tires of much greater cross-sectional and overall diameter, by merely increasing the strength of the equipment used.

The simplicity and utility of the device is thought to be made obvious from the foregoing description and it will, of course, be understood that various alterations and changes in the details of construction and arrangement of parts may be made within the scope of the invention herein disclosed and claimed.

This application is a continuation of application Serial No. 565,627.

What I claim is:

A device for use in conjunction with a full-circle tire retreading mold which comprises an elongated tubular rim member of slightly less diameter than the central opening of a given pneumatic tire casing, said tubular rim member having a radially projecting retaining flange on one end and external threads on the opposite end, a pair of spaced matched annular plates carried by said tubular member and adapted to engage the opposed side walls of a pneumatic tire, spacer rings carried by said tubular member and adapted to be inserted between said annular plates and the bead portions of said tire, said plates and spacer rings being removable from said tubular member only from the threaded end thereof, the threaded end of said tubular member having a slot which extends axially inwardly to a point more than half the length of said tubular member, and means engaging the threaded end of said rim member for forcing said plates together and exerting equal force upon the spaced side walls of said tire.

PAUL E. HAWKINSON.

REFERENCES CITED

The following references are of record in the file of this patent:

UNITED STATES PATENTS

| Number | Name | Date |
|---|---|---|
| 1,836,850 | Hudson | Dec. 15, 1931 |
| 2,024,941 | Miller | Dec. 17, 1935 |
| 2,045,937 | Woock | June 30, 1936 |
| 2,115,349 | Taylor | Apr. 26, 1938 |
| 2,124,345 | Grange | July 19, 1938 |
| 2,227,798 | Rihn et al. | Jan. 7, 1941 |